March 25, 1958  M. E. PUIM  2,828,039
FRONT LOADING AND ELEVATING ATTACHMENT FOR VEHICLES
Filed July 20, 1956  3 Sheets-Sheet 1

Manuel E. Puim
INVENTOR.

March 25, 1958 M. E. PUIM 2,828,039
FRONT LOADING AND ELEVATING ATTACHMENT FOR VEHICLES
Filed July 20, 1956 3 Sheets-Sheet 2
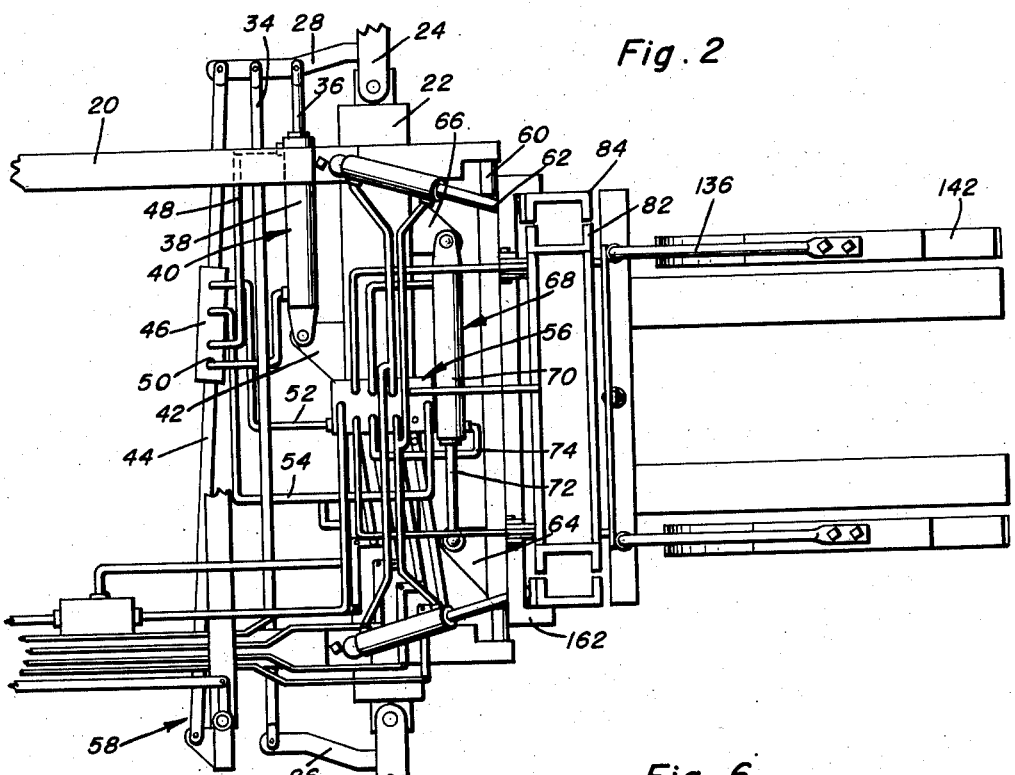
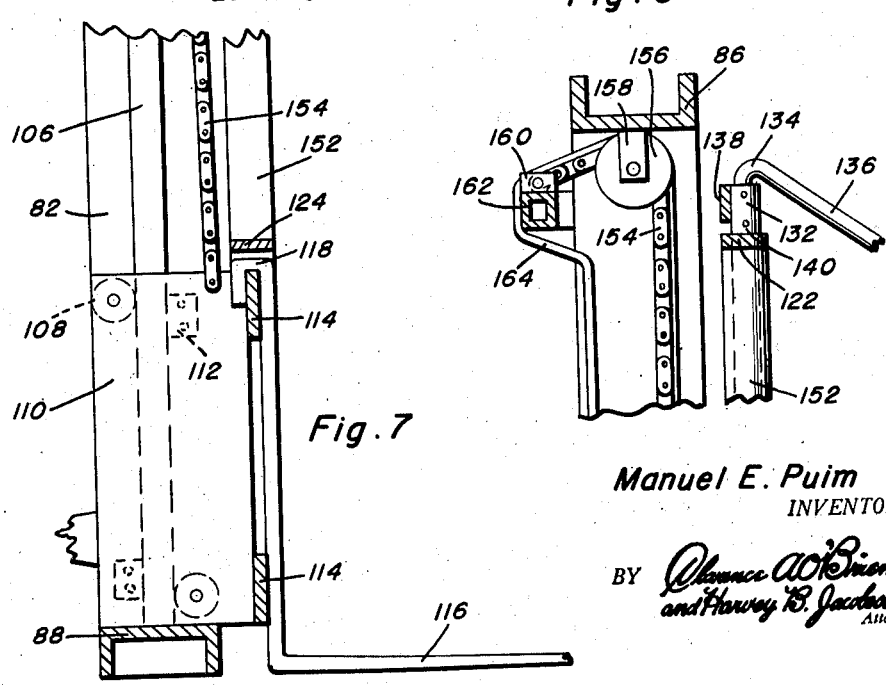
Manuel E. Puim
INVENTOR.

March 25, 1958 M. E. PUIM 2,828,039
FRONT LOADING AND ELEVATING ATTACHMENT FOR VEHICLES
Filed July 20, 1956 3 Sheets-Sheet 3
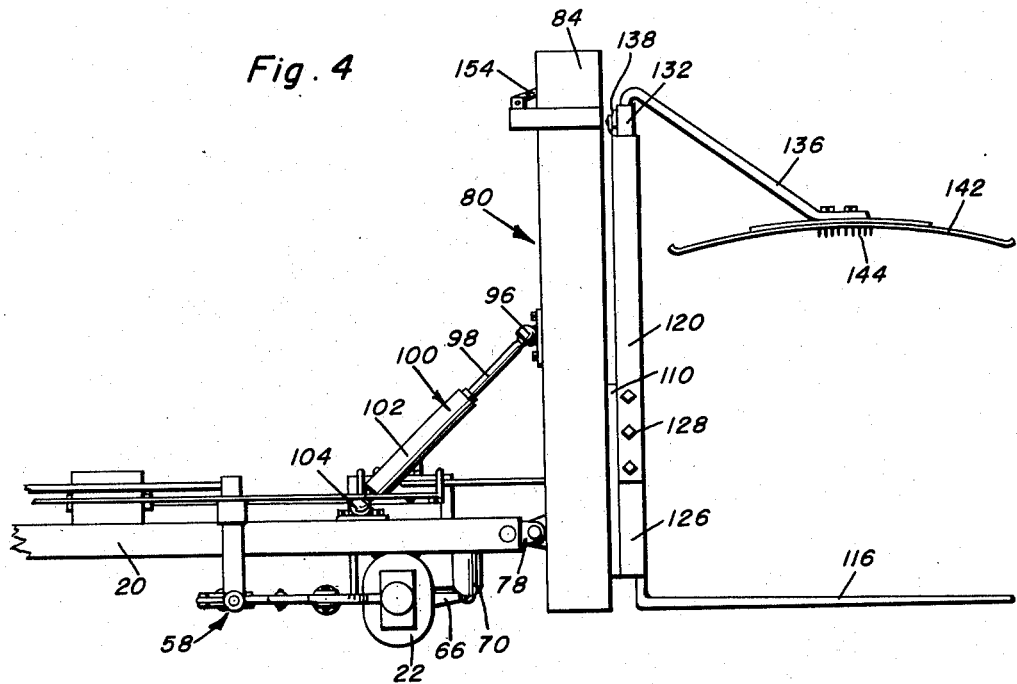
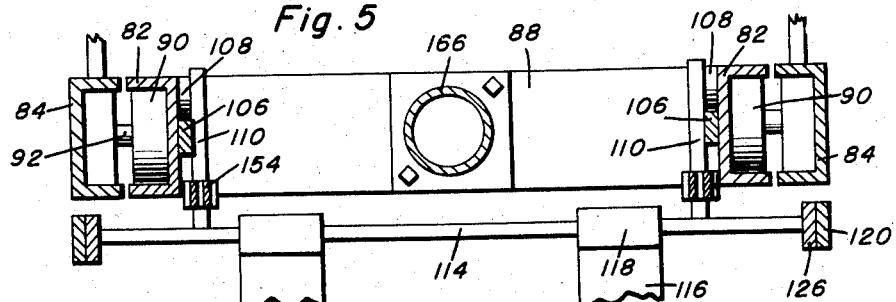
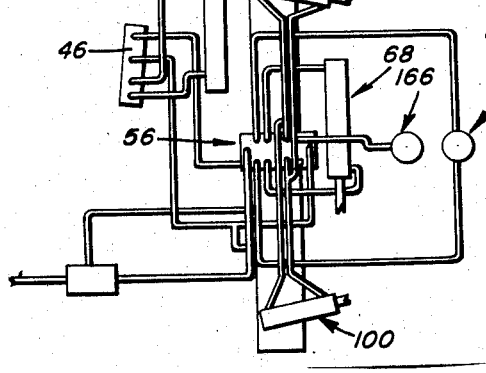
Manuel E. Puim
INVENTOR.

United States Patent Office 2,828,039
Patented Mar. 25, 1958

2,828,039

FRONT LOADING AND ELEVATING ATTACHMENT FOR VEHICLES

Manuel E. Puim, Los Angeles, Calif.

Application July 20, 1956, Serial No. 599,142

7 Claims. (Cl. 214—654)

This invention generally relates to an attachment for vehicles and more particularly to that type of attachment which may be easily secured to a tractor or the like for converting the tractor into a fork lift type of article handler.

An object of the present invention is to provide a load handling device in a form which may be attached to a tractor or which may be used independentently in which a fork lift is provided together with means for clamping a load on the lift fork, and side shifting the frame for alignment purposes.

Another object of the present invention is to provide an attachment for a front portion of a tractor in which the steering wheels for the tractor are actually supported from the attachment and the frame of the tractor is laterally adjustable in relation to the attachment frame for permitting proper positioning of the attachment in relation to the tractor for most effective use of the attachment.

Further objects of the present invention is to provide an attachment which is simple in construction, easy to operate, adjustable for use in various positions, hydraulically actuated and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a plan view of the attachment illustrating certain structural details thereof;

Figure 4 is an enlarged side elevational view of the attachment;

Figure 5 is a plan sectional view taken substantially upon the plane passing along section line 5—5 of Figure 3 illustrating the structural details of the facing trackways and the inter-connecting rollers for guiding movement thereof;

Figure 6 is a detailed sectional view taken substantially upon a plane passing along section line 6—6 of Figure 3 illustrating structural details of the mechanism for raising and lowering portions of the fork lift mechanism;

Figure 7 is a detailed sectional view taken substantially upon a plane passing along section line 7—7 of Figure 3 illustrating the manner of attaching the fork lift members together with the movable carrier for mounting the fork lift;

Figure 9 is a diagrammatic view of the hydraulic control system employed in the present invention.

Figure 1:
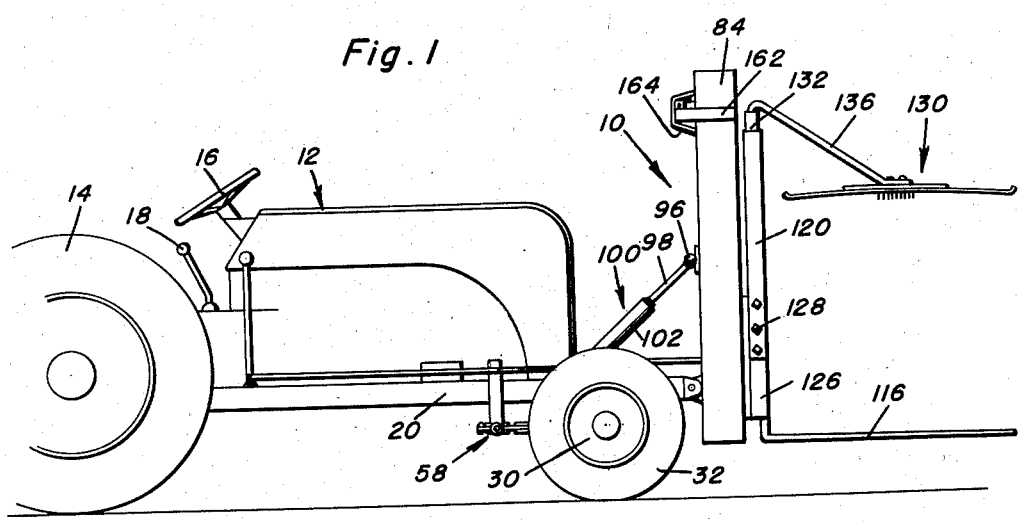
Figure 1 is a side elevational view of the attachment of the present invention attached to the front end of the tractor.
Figure 3:
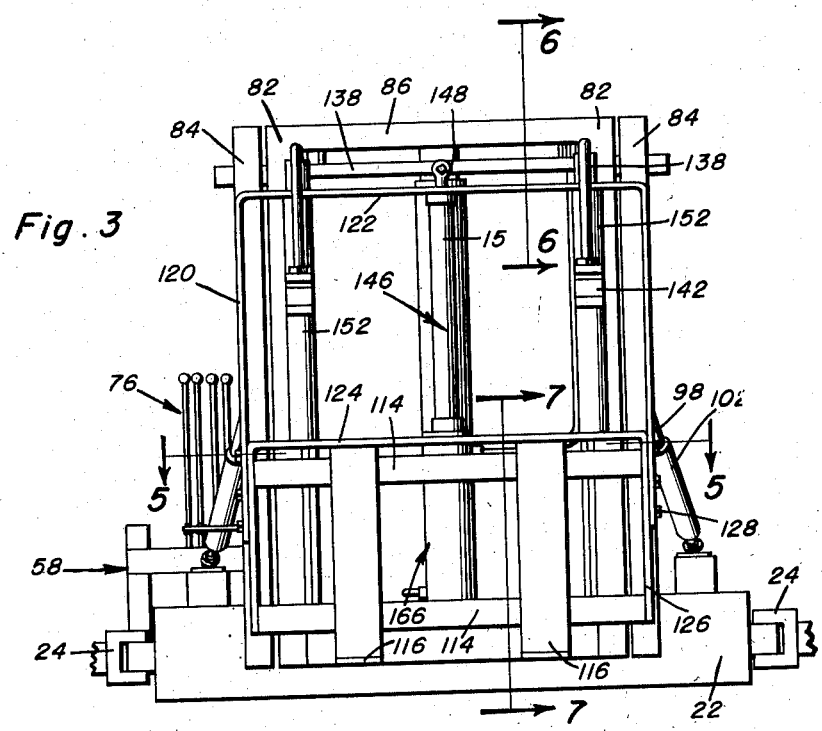
Figure 3 is a front elevational view of the attachment.
Figure 8:
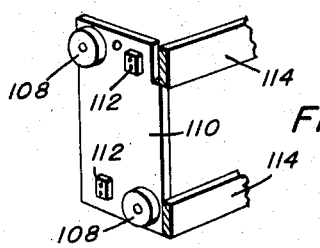
Figure 8 is a detailed perspective view of the carrier frame illustrating the rollers thereon.

Referring now specifically to the drawings, the numeral 10 generally designates the loading attachment of the present invention for a tractor generally designated by the numeral 12 and including the usual rear driving wheels 14, steering control wheel 16 and a gear shift lever 18. The attachment 10 includes a pair of longitudinally extending frame rails 20 which may be attached to the frame of the tractor 12 in any convenient manner, the details of which are not illustrated. Underlying the front portions of the frame rails 20 is an enlarged transverse axle 22 which is hollow and forms a fluid reservoir. At each end of the axle 22 is a wheel supporting spindle 24 having arms 26 and 28 extending rearwardly therefrom with the arm 28 being longer than the arm 26. The arms 26 and 28 are rigidly attached to the spindle 24 whereby pivotal movement of the arms 26 and 28 will pivot the steerable wheels 30 about substantially a vertical axis and the wheels 30 may be provided with any suitable pneumatic tires 32. The free end of the arm 26 is interconnected to a middle portion of the elongated arm 28 by an elongated tie rod 34 which is pivotally connected to the arms 26 and 28 in any suitable manner. The arm 28 is also pivotally connected to a piston rod 36 of a fluid pressure piston and cylinder arrangement with the cylinder being designated by the numeral 38 and the arrangement generally being designated by the numeral 40. The free end of the cylinder 38 is connected to a bracket 42 attached to the hollow axle 22 whereby expansion and retraction of the piston rod 36 will cause pivotal movement of the wheeels 30 about a vertical axis whereby the direction of the tractor 12 may be controlled. Pivotally connected to the free end of the elongated arm 28 is an elongated drag link 44 having a control valve 46 disposed therein with the control valve 46 being associated with fluid pressure pipe 48 connected to one end of the cylinder 38 and fluid pressure pipe 50 connected to the other end of the cylinder 38 for moving the piston rod 36 inwardly and outwardly. Other conduits 52 and 54 are provided for connection to a fluid pressure pump generally designated by the numeral 56. The other end of the drag link 44 is connected to a control mechanism generally designated by the numeral 58 that is connected to the steering control wheel 16 whereby the position of the steerable wheels 30 is controlled from the control wheel 16.

The forward end of the longitudinal rails 20 are interconnected by a transverse rod member 60 having a tubular sleeve 62 mounted thereon with the tubular sleeve 62 having a rearwardly projecting bracket 64 adjacent one side thereof and the axle 22 having a forwardly projecting bracket 66 in remote relation thereto for pivotally receiving the remote end of a fluid presure piston and cylinder arangement generally designated by the numeral 68 including a cylinder 70 and a piston rod 72 together with suitable conduits 74 connected to the fluid pressure pump 56 for shifting the tubular member 62 transversely in relation to the side rails 20 upon actuation of a proper control valve, all of which are designated by the numeral 76 and which may be disposed adjacent the operator's seat of the tractor 12. Projecting forwardly from the tubular member 62 is a plurality of pairs of pivot lugs 78 to which is attached a frame 80 which is generally vertically disposed and which has a pair of outwardly facing channel-shaped member 82 and a pair of inwardly facing channel-shaped members 84 which are disposed in face-to-face relation substantially as illustrated in Figure 5. The upper ends of the inner pair of channels 82 are interconnected by a continuation of the channels 82 designated by the numeral 86. The lower ends of the channels 82 are inter-connected by channel 88 thereby forming a rigid frame. Interconnecting the channels 82 and 84 for vertical sliding telescopic movement is a plurality of guide rollers 90. The rollers 90 are disposed within the inner channels 82 and are mounted on axles 92 supported from the outer channels 84. The outer channels 84 are inter-connected by a transverse member 94 for forming a rigid unit having a rearwardly facing ball socket 96 on each channel 84 to which is connected the piston rod 98 of a fluid pressure piston and cylinder arrangement 100 which includes a cylinder 102 swivelly conected to a socket 104 on the adjacent frame rail 20. The ends of the fluid pressure and piston cylinder arrangement 100 are universally connected to the frame rails 20 and channel members 84 whereby expansion and retraction will cause pivotal movement of the supporting frame 80 about substantially a horizontal axis but yet the universal connection will permit a lateral movement of the frame 80 with relation to the frame rails 20 upon actuation of the piston and cylinder arrangement 68.

The inner face of each of the inner channels 82 is provided with a vertically disposed longitudinal flat bar 106 of less width than the channel 82 for receiving rollers 108 on each side thereof with the rollers 108 being mounted on a carriage plate 110 with the rollers 108 being disposed at diametric points and guide blocks 112 and diagonal points. Interconnecting the front edges of the carriage plate 110 is a pair of transverse support bars 114 and a pair of lift forks 116 are supported on the support bar 114 with the vertical legs of the L-shaped lift fork 116 terminating in a hook portion 118 slidably engaging over the upper edge of the upper bar 114 to permit lateral adjustment thereof. Connected to the outer ends of the bars 114 is a pair of vertically upstanding side bars 120, which extend upwardly and are inter-connected by spaced transverse bars 122 and 124. The upstanding bars 120 are attached to end bars 126 by a plurality of fastening bolts 128 wherein the end bars 126 keep the fork lifts 116 in position, and the bolts 128 permit removal of the holddown clamp mechanism generally designated by the numeral 132. Mounted on the upper transverse bar 122 is a pair of upstanding sockets 132 receiving the downturned end 134 of a pair of clamp rods 136. The sockets 132 are interconnected by a transverse bar 138 and the clamp rods 130 are maintained in their sockets 132 by pins or fastening bolts 140. The outer end of each clamp rod 136 is provided with a downwardly concaved resilient spring 142 which is disposed in generally parallel relation to the horizontal portion of the lift fork 116. The arcuate or downwardly bowed spring 142 is provided with a plurality of depending pointed teeth 144 at the center thereof for effectively gripping an article positioned on the fork lift members 116. For urging the fork lift members 116 towards the clamp springs 142, a fluid pressure piston and cylinder arrangement 146 is provided with the piston rod 148 being connected to the center of the transverse bar 138 and the cylinder 150 being secured to the lower transverse bar 124, whereby expansion and contraction of the piston and cylinder 146 will cause movement of the lift forks 116 toward and away from the spring members 142.

This is permitted since the sockets 132 which receive the clamp rods 136 are telescopically received within depending tubular members 152 which interconnect bars 122 and 124 thereby permitting the elongated sockets 132 to move vertically upwardly and to permit detachment of the arms 136 by removing fastening members 140.

For raising and lowering the lift forks 116, a sprocket type chain 154 is connected to each carriage plate 110 at the upper edge thereof and extends over the pulley 156 mounted on the underside of the channel 86 on bracket 158. The chains 154 are terminally secured to lugs 160 on a transverse bar 162. Entrained over the pulley 156 and the chain 154 is a fluid pressure conduit 164 for providing pressure fluid to the piston and cylinder arrangement 146. The bracket 152 is connected with the outer channels 84 substantially as illustrated in Figure 6.

An enlarged piston and cylinder arrangement 166 interconnects the transverse channel 88 and the transverse channel 86 for raising and lowering the inner channels 82 which will effectively raise and lower the lift forks 116 inasmuch as the pulley 156 moves upwardly, the chain 154 will move the carriage plates 110 in an obvious manner.

While the control valves have not been specifically illustrated, the control handles 76 are provided for tilting the attachment 10 forward and rearwardly in a vertical plane, transversely of the frame rails 20, for raising and lowering the lift forks 116 and by clamping and unclamping the clamp members 142. The device is extremely rigid and may be used in the nature of an elevator such as for hay bails or the like whereby a plurality of hay bales may be gripped between the spring members 142 and the fork lift members 116 and raised to a vertically elevated position after which the clamp members 142 may be released and the mechanism tilted forwardly for dumping the hay bales to a desired position. Of course, it may be used just as effectively for unloading as loading and is so constructed that relatively few movable parts receiving wear are employed and all such parts are open and readily available for lubrication, service or replacement. All moving parts are also provided with rolling frictional contact where possible thereby reducing the wear and also reducing the work necessary for raising or lowering and otherwise using the attachment. While the numeral 56 has been designated as a fluid pump, it will be understood that it is a fluid supply and the pump may actually be positioned on the tractor and driven by a power take-off therefrom with the housing 56 being no more than a manifold or distributor controlled by a control valve mechanism of any suitable type.

The lift frame incorporating the channel member 84 is pivotally mounted on a support frame therefor which is constituted by the tubular sleeve 62 mounted on the transverse rod 60 interconnected to frame rails 20. By expanding and contracting the piston and cylinder arrangement 68, the support frame and lift frame mounted thereon may be shifted laterally thus shifting the fork members 116 laterally for proper alignment with a load or for positioning a load in a restricted space. As an example, a pallet of fruit may be disposed on a truck or storage area wherein it is necessary that the pallet be accurately positioned for removing the pallet from a restricted area or for positioning the pallet into an area just large enough to receive the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A loading attachment for a tractor comprising longitudinal brackets adapted to be attached to the tractor, an upstanding frame pivotally and laterally movably attached to the front end of said brackets, a pair of forwardly extending fork members vertically movably mounted on said frame, means for pivoting said frame in a vertical plane, means for raising and lowering said fork members, and article clamp means disposed in opposition to said fork members for clamping articles therebetween, said brackets including a transverse axle adjacent the front ends, a steerable wheel on each end of said axle, means for controlling said wheels, and means for shifting the upstanding frame transversely in relation to the brackets for aligning the fork members with a load, said axle being hollow for providing a reservoir for a fluid pressure system, a fluid pump having an intake connected to the reservoir and a discharge line, a control valve for the discharge line on the pump, said means for laterally shifting the frame including a laterally disposed fluid pressure actuated piston and cylinder arrangement interconnecting the axle and frame and communicated with the control valve and reservoir.

2. A loading attachment for a tractor comprising longitudinal brackets adapted to be attached to the tractor, an upstanding frame pivotally and laterally movably attached to the front end of said brackets, a pair of forwardly extending fork members vertically movably mounted on said frame, means for pivoting said frame in a vertical plane, means for raising and lowering said fork members, and article clamp means disposed in opposition to said fork members for clamping articles therebetween, said brackets including a transverse axle adjacent the front ends, a steerable wheel on each end of said axle, means for controlling said wheels, and means for shifting the upstanding frame transversely in relation to the brackets for aligning the fork members with a load, said means for raising and lowering said fork members including a vertically movable sub-frame mounted on said frame, a carriage movably mounted on said sub-frame, said lift fork members being movably mounted on said carriage for transverse adjustment, a pulley mounted on the upper end of the sub-frame, a flexible line terminally attached to the carriage and the frame for raising and lowering the carriage and lift fork members when the sub-frame is raised and lowered, and fluid pressure actuated means interconnecting said frame and sub-frame for moving the sub-frame.

3. The combination of claim 2 wherein said article clamp means includes a pair of downwardly facing concave spring members movably mounted on said carriage, and fluid pressure actuated means for urging the spring members towards the lift fork members.

4. The combination of claim 3 wherein said spring members are provided with depending pointed projections in the center thereof for engagement with a load for preventing slippage thereof.

5. A load handling device comprising a movable frame having a transverse axle with wheel means mounted on the outer ends thereof, an upstanding frame connected to said mobile frame for swinging movement in a vertical plane, means for tilting said upstanding frame, forwardly projecting lift fork means vertically movably supported from said upstanding frame, clamp means movably supported on said fork means for movement towards and away from the fork means for clampingly engaging a load, means for raising and lowering the fork means and clamp means as a unit, means for raising and lowering the clamp means in relation to the fork means for clamping and releasing a load, a fluid pressure system including a fluid pump, each of said operating means including a fluid pressure actuated piston and cylinder arrangement, valve means for independently actuating said piston and cylinder arrangements, said transverse axle being hollow and forming a reservoir for said fluid pump.

6. The combination of claim 5 wherein said upstanding frame is laterally slidably connected to said mobile frame, a laterally extending piston and cylinder arrangement for moving the upstanding frame laterally for laterally orientating the fork means.

7. The combination of claim 6 wherein said lift fork means includes a carriage vertically movably mounted on said upstanding frame, a transverse support bar on said carriage, a pair of forwardly projecting lift forks laterally slidably mounted on said bar.

References Cited in the file of this patent

UNITED STATES PATENTS

| | | |
|---|---|---|
| 2,427,301 | Puim | Sept. 9, 1947 |
| 2,495,143 | Simmonds | Jan. 17, 1950 |
| 2,611,497 | Backofen | Sept. 23, 1952 |
| 2,653,678 | Lehrman | Sept. 29, 1953 |
| 2,684,165 | Hill | July 20, 1954 |
| 2,757,813 | Adams | Aug. 7, 1956 |

FOREIGN PATENTS

| | | |
|---|---|---|
| 144,506 | Australia | Dec. 28, 1951 |